(12) United States Patent
Englert et al.

(10) Patent No.: US 11,775,811 B2
(45) Date of Patent: Oct. 3, 2023

(54) SCHEDULING HETEROGENEOUS EXECUTION ON HETEROGENEOUS HARDWARE

(71) Applicant: Apple Inc., Cupertino, CA (US)

(72) Inventors: Benjamin P. Englert, San Francisco, CA (US); Elliott B. Harris, San Francisco, CA (US); Neil G. Crane, San Francisco, CA (US); Brandon J. Corey, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 811 days.

(21) Appl. No.: 16/242,999

(22) Filed: Jan. 8, 2019

(65) Prior Publication Data

US 2020/0218969 A1    Jul. 9, 2020

(51) Int. Cl.
*G06N 3/08* (2023.01)
*G06N 20/00* (2019.01)

(52) U.S. Cl.
CPC ............... *G06N 3/08* (2013.01); *G06N 20/00* (2019.01)

(58) Field of Classification Search
CPC .................................................... G06F 9/3836
See application file for complete search history.

(56) References Cited

U.S. PATENT DOCUMENTS

2007/0283358 A1    12/2007   Kasahara

FOREIGN PATENT DOCUMENTS

WO    WO-2019001418 A1 *   1/2019   ............ G06F 9/223

OTHER PUBLICATIONS

Ahmad Al Badawi, Ali Shatnawi. Static scheduling of directed a cyclic data flow graphs onto multiprocessors using particles warm optimization. 2013 (Year: 2013).*
Sanjeev Baskiyar and Christopher Dickinson. Scheduling directed a-cyclic task graphs on a bounded set of heterogeneous processors using task duplication. 2005. Journal of parallel and distributed computing. (Year: 2005).*
Yehuda Koren, Stephen C. North, and Chris Volinsky. Measuring and Extracting Proximity Graphs in Networks. 2007. ACM Transactions on Knowledge Discov. Data. (Year: 2007).*

(Continued)

*Primary Examiner* — Kakali Chaki
*Assistant Examiner* — Michael H Hoang
(74) *Attorney, Agent, or Firm* — BAKERHOSTETLER

(57) ABSTRACT

The subject technology determines input parameters and an output format of algorithms for a particular functionality provided by an electronic device. The subject technology determines an order of the algorithms for performing the particular functionality based on temporal dependencies of the algorithms, and the input parameters and the output format of the algorithms. The subject technology generates a graph based on the order of the algorithms, the graph comprising a set of nodes corresponding to the algorithms, each node indicating a particular processor of the electronic device for executing an algorithm. Further, the subject technology executes the particular functionality based on performing a traversal of the graph, the traversal comprising a topological traversal of the set of nodes and the traversal being based on a score indicating whether selection of a particular node for execution over another node enables a greater number of processors to be utilized at a time.

20 Claims, 7 Drawing Sheets

(56) References Cited

OTHER PUBLICATIONS

Heterogeneous System Architecture. Wikipedia. Accessed on Aug. 6, 2021 (Year: 2014).*
Tariq, Rehan, et al. "Directed acyclic graph based task scheduling algorithm for heterogeneous systems." Proceedings of SAI Intelligent Systems Conference. Springer, Cham, 2018. https://link.springer.com/content/pdf/10.1007/978-3-030-01057-7_69.pdf (Year: 2018).*
Bosilca, George, et al. "DAGuE: A generic distributed DAG engine for high performance computing." Parallel Computing 38.1-2 (2012): 37-51. https://www.sciencedirect.com/science/article/pii/S0167819111001347 (Year: 2012).*
Baskiyar, Sanjeev, and Rabab Abdel-Kader. "Energy aware DAG scheduling on heterogeneous systems." Cluster Computing 13.4 (2010): 373-383. https://link.springer.com/content/pdf/10.1007/s10586-009-0119-6.pdf (Year: 2010).*
Wang, Guan, et al. "HSIP: A novel task scheduling algorithm for heterogeneous computing." Scientific Programming 2016 (2016). https://www.hindawi.com/journals/sp/2016/3676149/ (Year: 2016).*
Abadi, Martin, et al. "Tensorflow: a system for large-scale machine learning." Osdi. vol. 16. No. 2016. 2016. https://www.usenix.org/system/files/conference/osdi16/osdi16-abadi.pdf (Year: 2016).*
International Search Report and Written Opinion from PCT/US2019/066645, dated Feb. 26, 2020, 15 pages.

\* cited by examiner

510

Integration (e.g., before execution)

Input → 1920x1080, RGBA, square, P3/SRGB

Output → "Scenes"

550

Running (e.g., during execution)

addInference: Segmentation addInference: Landmarks

*FIG. 5*

SCHEDULING HETEROGENEOUS EXECUTION ON HETEROGENEOUS HARDWARE

TECHNICAL FIELD

The present description generally relates to scheduling heterogeneous execution on heterogeneous hardware including executing neural network models which encompass definitions of network structure and the layers and weights within, and dispatching operations for neural network models and other applications among various hardware components of a given electronic device.

BACKGROUND

Software engineers and scientists have been using computer hardware for machine learning to make improvements across different industry applications including image classification, video analytics, speech recognition and natural language processing, etc. For example, deep learning neural networks are being utilized more frequently to create systems that can perform different computing tasks from sizable amounts of data including functionality related to making predictions using such data.

BRIEF DESCRIPTION OF THE DRAWINGS

Certain features of the subject technology are set forth in the appended claims. However, for purpose of explanation, several embodiments of the subject technology are set forth in the following figures.

FIG. 5 conceptually illustrates example information derived during an integration stage and example code for performing predictions using a machine learning algorithm in accordance with one or more implementations.

DETAILED DESCRIPTION

Figure 1:
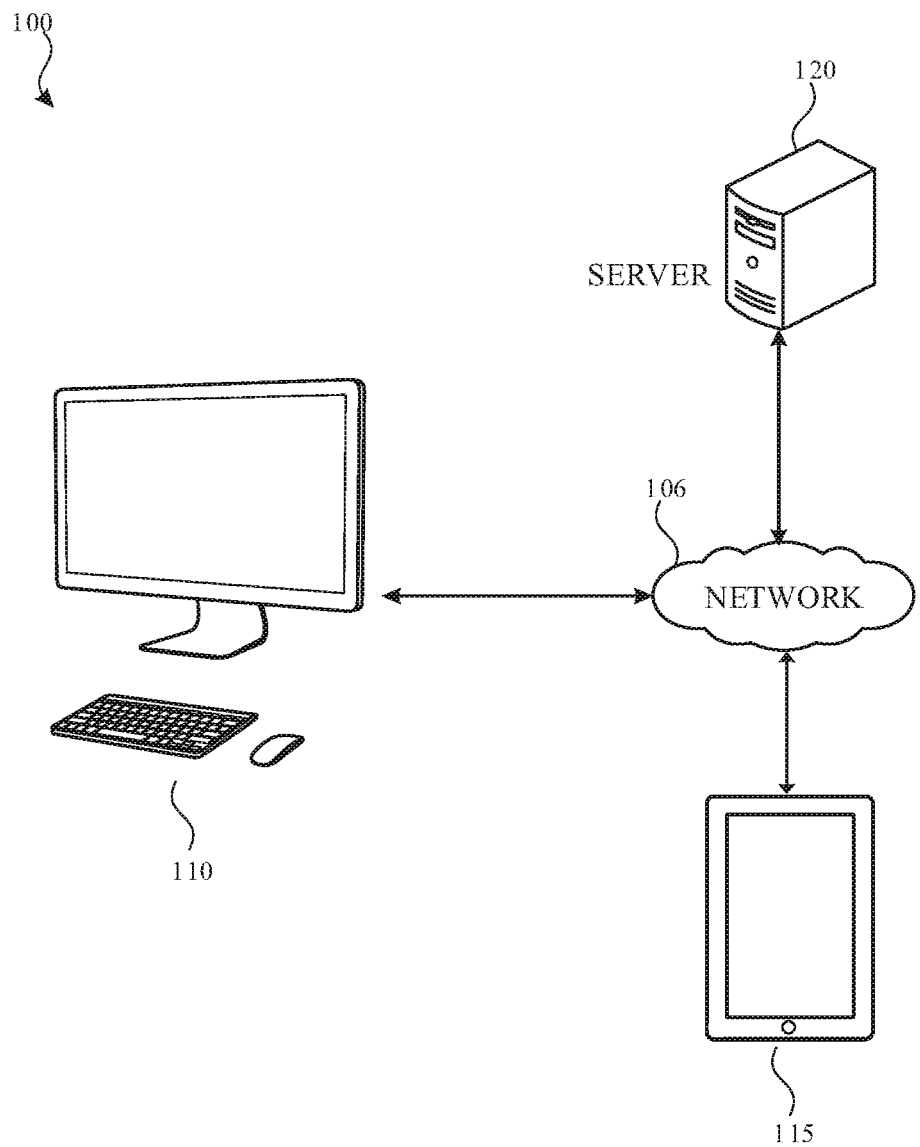
FIG. 1 illustrates an example computing environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Machine learning has seen a significant rise in popularity in recent years due to the availability of massive amounts of training data, and advances in more powerful and efficient computing hardware. Machine learning may utilize neural network models that are executed to provide predictions in computer vision applications (e.g., analyzing images and videos) among many other types of applications. Existing electronic devices such as modern smartphones include various sensors and access to networks (e.g., the Internet, servers in the cloud, etc.), which may provide different input data to feed into such neural network models to make predictions.

A common approach for deploying a neural network model is utilizing a graphical processing unit (GPU) for training a neural network (NN) model, and also for executing the neural network model on new input data post-training. As discussed further below, specialized, custom, and/or dedicated hardware that is designed to accelerate neural networks, such as a neural processor, may be provided to perform certain operations in a more efficient manner or when such operations are not supported by the GPU and/or CPU. A central processing unit (CPU) and memory can also be utilized to instantiate and execute neural network models of various configurations.

Specialized (e.g., dedicated) hardware may be used to optimize particular operations from a given NN model. In particular, as discussed further in FIG. 2, a given electronic device may include a neural processor, which can be implemented as circuitry that performs various machine learning operations based on computations including multiplication, adding and accumulation. Such computations may be arranged to perform, for example, convolution of input data. A neural processor, in an example, is specifically configured to perform machine learning algorithms, typically by operating on predictive models such as NNs. In one or more implementations, an electronic device may include a neural processor in addition to a CPU and/or a GPU. In an example, the neural processor may have the highest efficiency, with respect to energy consumption (e.g., battery power), for performing a particular operation related to a given NN, in general among a CPU and/or a GPU included in an electronic device.

A CPU, as discussed herein, can refer to a main processor in a given electronic device that performs operations for basic arithmetic, logical, control and input/output operations specified by the instructions of a computer program or application, including some operations for neural network models. A GPU, as discussed herein, can refer to a specialized electronic circuit designed to perform operations for rendering graphics, which is also being utilized in many instances to process computational workloads for machine learning operations (e.g., as specified by instructions of a computer program or application). The CPU, GPU, and neural processor may each have different computational specifications and capabilities depending on their respective implementations where each of the aforementioned components can provide varying degrees of performance for certain operations in comparison with the other components.

Implementations of the subject technology improve the computing functionality of a given electronic device with heterogeneous hardware (e.g., CPU, GPU, neural processor) by 1) saturating utilization of each processor in an automated manner (e.g., without requiring specific "hand-tuned" or custom code from a developer) when performing operations in connection with neural network models, such that each of the processors is being utilized with a minimum amount of downtime, and 2) automatically determining an order of algorithms to correctly maintain dependencies of operations and facilitate easier usage of neural networks in an application programming environment. These benefits therefore are understood as improving the computing functionality of a given electronic device, such as an end user device which may generally have less computational and/or power resources available than, e.g., one or more cloud-based servers.

As discussed herein, saturation of available processors refers to implementations that attempt to minimize periods of idle time for the processors (e.g., heterogeneous hardware such as a CPU, GPU, and neural processor) provided by an electronic device such that the concurrent runtime of the processors is maximized. Idle time for a processor can be understood as a time period when a processor is waiting for more instructions to process and/or when the processor is underutilized based on some sort of metric (e.g., when utilization of the processor is below a certain threshold value). For example, to determine processor usage, implementations may analyze a queue of instructions (e.g., in a processing pipeline provided in hardware of the processor) and determine a number of instructions that the processor still needs to process. Using this metric, it may be determined whether the processor is being underutilized at the current time. It is appreciated that other implementations to determine processor utilization may be provided and still be within the scope of the description herein.

FIG. 1 illustrates an example network environment 100 for in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120, the electronic device 115 and/or the server 120, and/or electronic device 110 and/or the electronic device 115. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 115, and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a desktop computer. The electronic device 110 may be, and/or may include all or part of, the electronic system discussed below with respect to FIG. 7.

In one or more implementations, the electronic device 110 may provide a system for compiling neural network models into executable form (e.g., compiled code) as described herein. In particular, the subject system may include a compiler for compiling source code associated with neural network models. In an example, the subject system, using the compiled code, can create a software package for deployment on a target device, such as the electronic device 115, with facilitation from the server 120. When executing the compiled neural network model, the target device can execute various algorithms on either a CPU, GPU, or neural processor.

The electronic device 115 may be, for example, a portable computing device such as a laptop computer, a smartphone, a peripheral device (e.g., a digital camera, smart speaker, headphones), a tablet device, a wearable device such as a watch, a band, and the like, or generally any electronic device. The electronic device 115 may further include one or more processors having different compute capabilities, including, for example, a CPU, a GPU, and/or a neural processor for performing neural network operations. In FIG. 1, by way of example, the electronic device 115 is depicted as a tablet device. In one or more implementations, the electronic device 115 may be, and/or may include all or part of, the electronic device discussed below with respect to the electronic system discussed below with respect to FIG. 7.

In one or more implementations, the server 120 deploys the compiled code included in a software package to a target device for execution. The electronic device 115, in an example, may be a target device for receiving the software package with the compiled code and for executing the compiled code in a runtime environment of the electronic device 115. The electronic device 115 (or any electronic device that is a target device) includes a framework that is enabled to schedule various algorithms included in the compiled code and subsequently make decisions for scheduling and/or dispatching each operation (e.g., either running it on a CPU, GPU, specialized processor such as a neural processor, etc.) in order to achieve saturation of each processor when feasible. A framework can refer to a software environment that provides particular functionality as part of a larger software platform to facilitate development of software applications.

Figure 2:
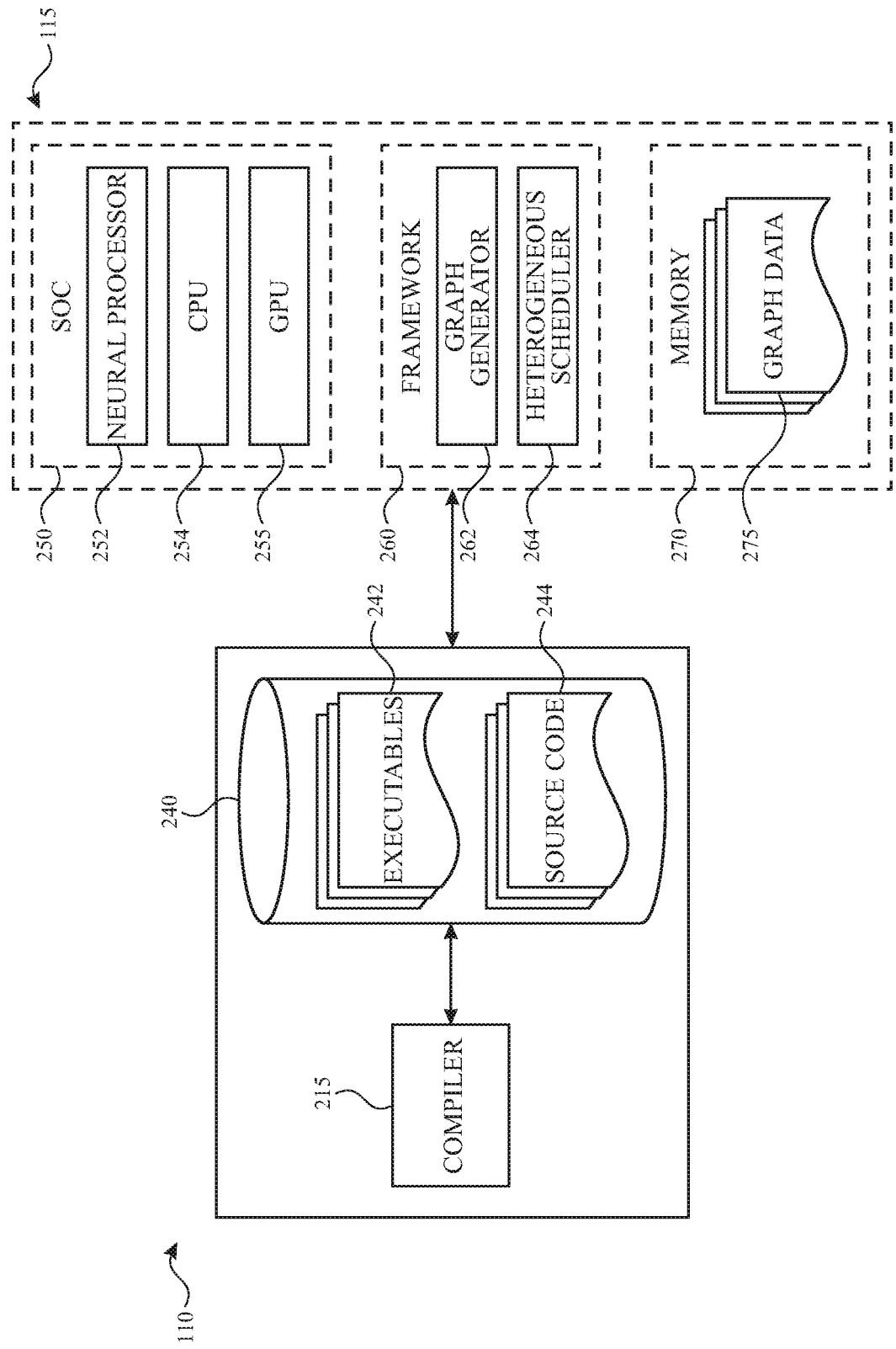
FIG. 2 illustrates an example computing architecture for compiling source code and deploying executables on a target platform that is enabled to schedule operations for execution on various processors in accordance with one or more implementations.

FIG. 2 illustrates an example computing architecture for compiling source code and deploying executables on a target platform that is enabled to schedule operations for execution on various processors, e.g., having different compute capabilities, in accordance with one or more implementations. For explanatory purposes, the computing architecture is described as being provided by the electronic devices 110 and 115 of FIG. 1, such as by a processor and/or memory of the electronic devices 110 and 115; however, the computing architecture may be implemented by any other electronic devices. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the computing architecture includes a compiler 215. A memory 240 includes source code 244, which after being compiled by the compiler 215, generates executables 242 that can be deployed to different target platforms for execution. In an example, the source code 244 may include code for various algorithms, which may be utilized, alone or in combination, to implement particular functionality for executing on a given target device. A target device, as discussed above, may include various hardware sensors and different processors (e.g., as provided by the electronic device 115) that are utilized when running the executable 242 on the target device. In an example, the particular functionality may include image processing or computer vision related functionality such as generating a depth map based on a various images that may utilize or more machine learning algorithms (e.g., predictions).

Although the compiler 215 is provided on the electronic device 110 in the example of FIG. 2, in some implementations, such a compiler may be provided on a particular electronic device (e.g., the electronic device 115) that locally compiles source code and executes the compiled code on the same device. In an implementation, the source code 244 can be compiled for a specific target platform and then deployed to a different device such as the electronic device 115 for execution.

As further illustrated, the electronic device 115, in an implementation, includes a system-on-chip (SOC) 250. The SOC 250 includes a neural processor 252, a CPU 254, and a GPU 255, which may be utilized to execute operations from compiled code from one or more of the executables 242. The electronic device 115 includes a memory 270 which may store the compiled code from one or more of the executables 242 for running on the electronic device 115.

Figure 3:
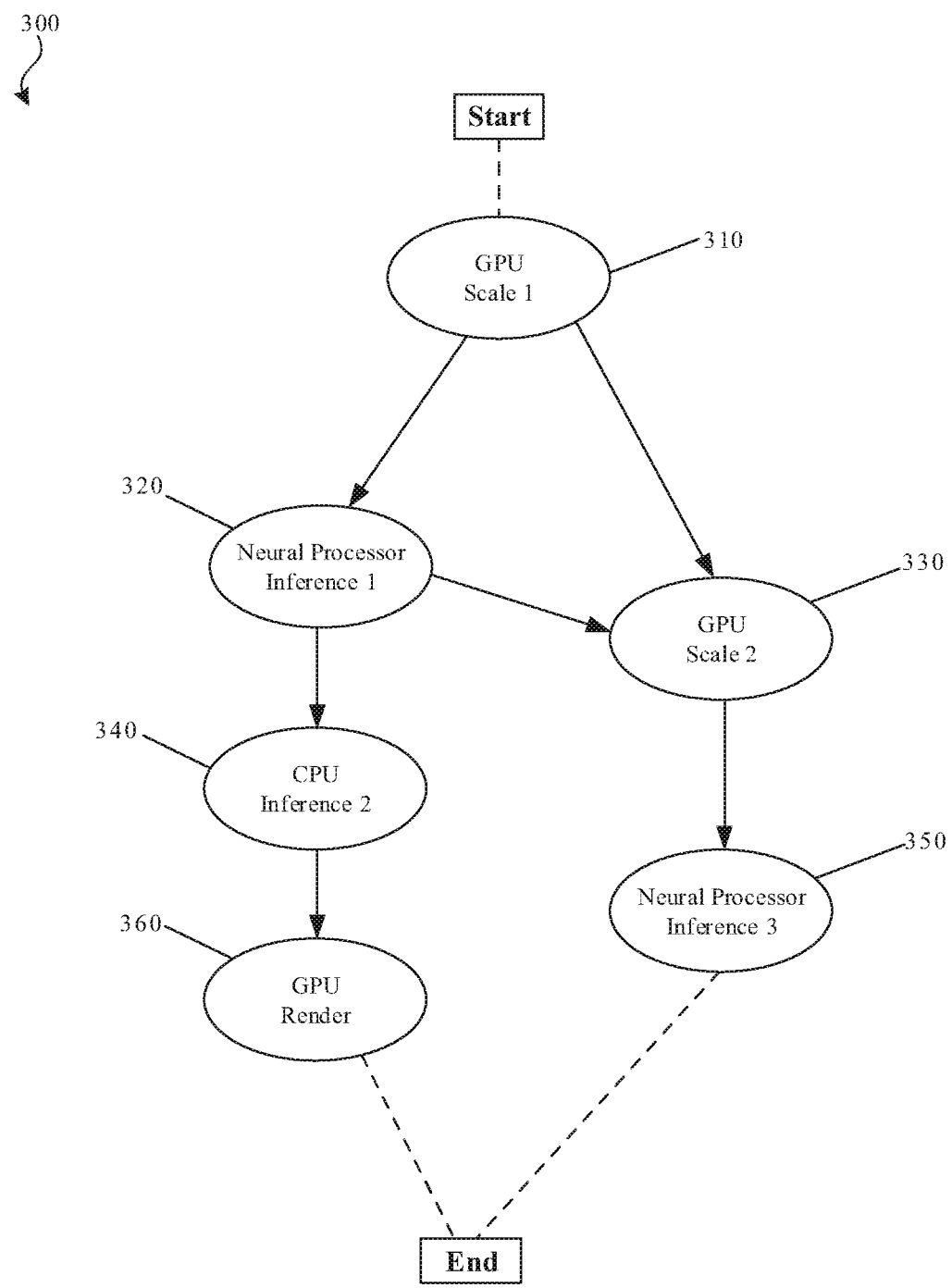
FIG. 3 conceptually illustrates an example graph generated during execution of compiled code on a target device in accordance with one or more implementations.
Figure 4:
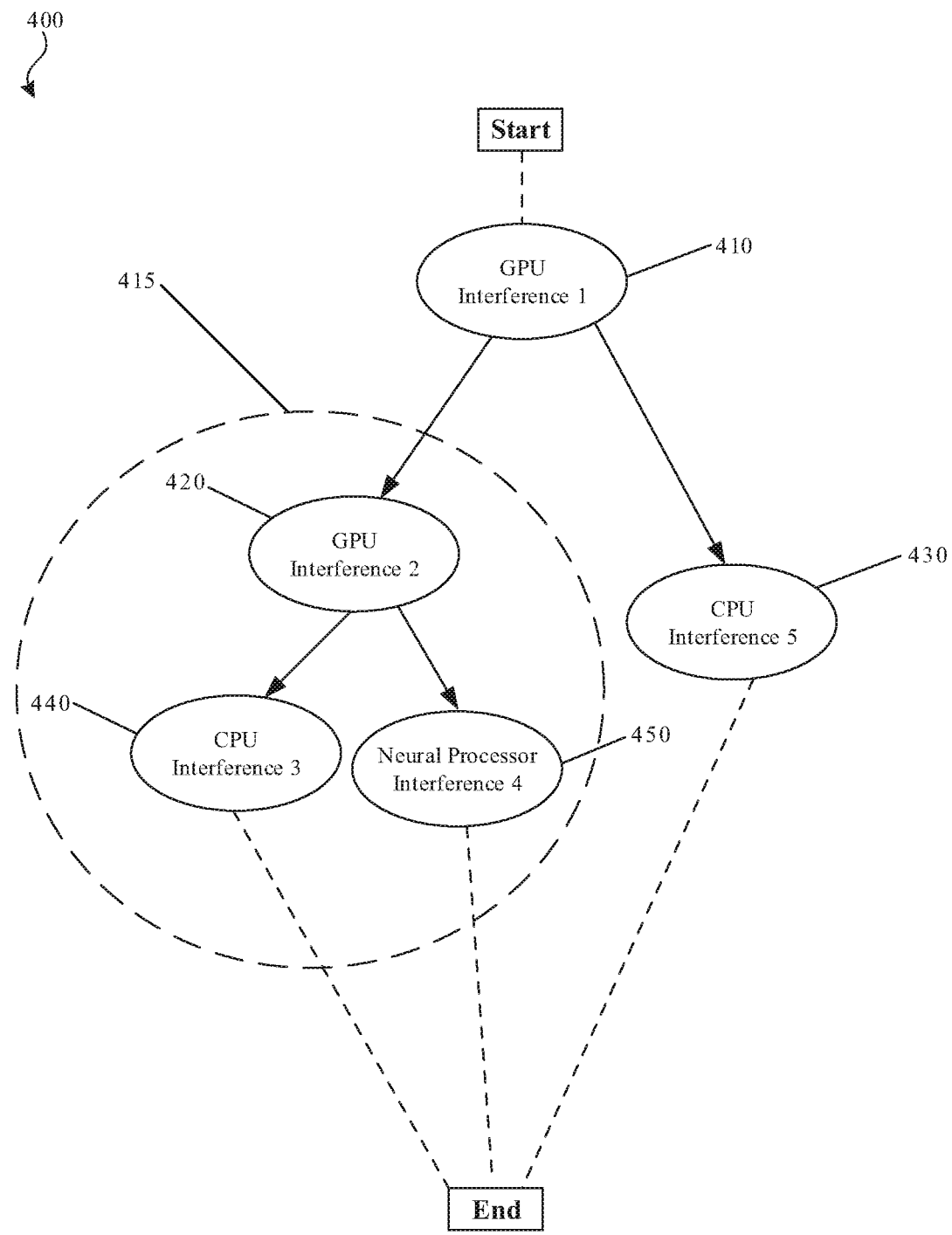
FIG. 4 conceptually illustrates an example graph for performing a weighted traversal in order to saturate available processors when performing a particular functionality on a target device in accordance with one or more implementations.

The electronic device 115 includes a framework 260 that is enabled to schedule the compiled code and subsequently make decisions for scheduling and/or dispatching each operation (e.g., either running it on a CPU, GPU, specialized processor such as a neural processor, etc.) in order to achieve saturation of each processor when feasible (e.g., based on a topological order or temporal dependency of algorithms). The framework 260 includes a graph generator 262 and a heterogeneous scheduler 264. In an implementation, the heterogeneous scheduler 264 dispatches to hardware at a higher level such as that of the neural network model itself or a prediction (e.g., inference) operation, which is illustrated in FIGS. 3 and 4. The subject technology can also provide dispatching of individual operations between hardware within a neural network model, and can, in an implementation, be performed separately by a lower-level framework or different framework to enable otherwise unsupported features to run successfully.

In some implementations, prior to runtime, the framework 260 determines, as part of an integration stage, input parameters and an output format of each algorithm for a particular functionality (e.g., computer vision application for analyzing images and/or videos) provided in the compiled code, and temporal dependencies to determine an order of the algorithms for performing the particular functionality. Particular functionality as referred to herein may utilize machine learning operations to perform predictions among other types of operations. Examples of source code analyzed during the integration stage is further described in FIG. 5 below.

When executing the compiled code, the graph generator 262 may determine which algorithm(s) to execute for a particular functionality, and then generate a graph, using information derived from the aforementioned integration stage, that includes nodes that correspond to a data flow of the algorithms implementing the functionality. The graph may be stored in the memory 270 as graph data 275 and accessed when performing a traversal of the graph as discussed below. In an implementation, the graph is a directed acyclic graph (DAG) and is built based on results of the aforementioned integration stage and includes nodes including an indication of which processor each of the algorithms may run on. An example graph that is generated in this manner is discussed further in FIG. 3 below.

The heterogeneous scheduler 264, during runtime of the compiled code, performs a weighted traversal of the graph while processing algorithms from the compiled code, and may reevaluate the graph after each algorithm is completed to select a subsequent node/algorithm for executing, which is discussed in more detail in FIG. 4 below. A weighted traversal determines an order for the heterogeneous scheduler 264 to visit the nodes of the graph based at least in part on a particular score assigned to each of the nodes. Such a score, as described further herein, can be based a saturation score indicating an amount of processors that are being utilized, and also a distance from the end of the graph.

FIG. 3 conceptually illustrates an example graph 300 generated during execution of compiled code on a target device (e.g., the electronic device 115) in accordance with one or more implementations. FIG. 3 will be discussed by reference to FIG. 2, particularly with respective components of the framework 260.

As discussed above, the subject technology, for example, generates a graph representing a data flow for performing a particular functionality that includes respective nodes representing various algorithms and an indication at each node of which processor executes the algorithm. Such algorithms may include one or more machine learning operations (e.g., predictions that utilize neural network models). Each node in the graph is connected to another node using a directed edge. In the graph, the output of an algorithm in a first node is received as an input to a second node when the first node and the second node are connected via a directed edge. In an example, the graph is a directed acyclic graph (DAG) where the DAG includes directed edges between two respective nodes, and includes no loops such that there is no path starting at any node that follows a sequence of directed edges and eventually loops back to the same node.

In an implementation, the graph generator 262, as provided by the framework 260, generates a graph 300 corresponding to a particular functionality provided by compiled code (e.g., from executables 242) to be executed by the electronic device 115. The graph generator 262, for example, may analyze the executing compiled code (e.g., received from executables 242 provided by the electronic device 110) in order to generate the nodes (e.g., corresponding to algorithms) included in the graph 300. In particular, the graph generator 262 may determine the various algorithms that implement the functionality and perform a topological sort to produce a directed acrylic graph (e.g., the graph 300) where the nodes of respective algorithms are ordered in accordance with their dependencies, and includes directed edges between respective nodes. For example, graph generator 262 determines that a first algorithm depends on input data that is provided by a second algorithm, and therefore would order the second algorithm before the first algorithm when generating the graph.

As illustrated in FIG. 3, the graph 300 includes a node 310 corresponding to a first algorithm (e.g., "Scale 1"). Node 310 includes directed edges to a node 320 and a node 330, indicating that either algorithm corresponding to node 320 or node 330 may be executed after the algorithm corresponding to the node 310. A node 340 is connected to node 320, and another directed edge connects a node 360 after node 340. Starting at node 330, a directed edge connects to a node 350.

As also illustrated in FIG. 3, node 320, node 340, and node 350 correspond to respective machine learning algorithms for providing predictions utilizing respective output data from a previous node. For example, node 320 provides a prediction using, as input data, the output of the algorithm from node 310. Using the output of the algorithm at node 320 as input data, node 340 provides a prediction as output to be received by node 360 as input data. In the example of the graph 300, the algorithm at node 360 uses the input data received from node 340 to perform operations to render content.

Starting at node 330, the outputs of node 310 and node 320 are used as inputs to perform the algorithm at node 330 (e.g., "Scale 2"). Continuing from node 330, the output of node 330 is received as input data to the algorithm performed at node 360 which provides a prediction based at least on the input data.

As further illustrated in FIG. 3, each of the nodes of the graph 300 may also include an indication of a respective processor that performs the corresponding algorithm. In this example, the graph generator 262 includes respective indications of GPU for node 310, node 330, and node 360, respective indications of neural processor for node 320 and node 350, and an indication of CPU for node 340. In an example, information for indicating a respective processor that performs an algorithm is derived at least in part on analyzing code corresponding to the algorithm. In an example, such code may include statements that indicate which processor that performs the algorithm. In another example, the system may assign algorithms in a static manner to a particular processor provided by an electronic device (e.g., the electronic device 115). In yet another example, algorithms may be dynamically assigned to a particular processor.

FIG. 4 conceptually illustrates an example graph 400 for performing a weighted traversal in order to saturate available processors (e.g., neural processor 252, CPU 254, and GPU 255) when performing a particular functionality on a target device (e.g., the electronic device 115) in accordance with one or more implementations. FIG. 4 will be discussed by reference to FIG. 2, particularly with respect components of the framework 260. The graph 400 is a directed acyclic graph (DAG) where the DAG includes directed edges between two respective nodes.

As discussed above, saturation of available processors refers to implementations that attempt to minimize periods of idle time for the processors (e.g., heterogeneous hardware such as a CPU, GPU, and neural processor) provided by an electronic device such that the concurrent runtime of the processors is maximized. As described further below, saturation of available processors can be accomplished by analyzing paths through the graph 400, and selecting a particular node for dispatching to a processor for execution where the selected node is included along a path that utilizes a greater number of processors in comparison with selecting a different node along a different path.

In the example of FIG. 4, the graph generator 262, as provided by the framework 260, generates the graph 400 while executing compiled code (e.g., from executables 242). Each node (e.g., vertex) in the graph 400 corresponds to a respective algorithm to be performed on a particular processor (e.g., CPU, GPU, or neural processor). An edge in the graph 400 can correspond to a directed edge connecting to a subsequent node corresponding to a subsequent algorithm to be performed on a particular processor.

The graph 400 include nodes that are sorted in topological order. The heterogeneous scheduler 264 performs a weighted traversal of the graph 400 while dispatching algorithms to various processors for execution. In an implementation, the heterogeneous scheduler 264 reevaluates the graph 400 after each algorithm is completed to select a subsequent node (e.g., algorithm) for executing. For example, the heterogeneous scheduler 264 selects node 410 in the graph 400 corresponding to a first algorithm ("Inference 1"), which is executed on the GPU. Upon completion of the first algorithm, the heterogeneous scheduler 264 selects a subsequent node connected, by a directed edge, to the node 410 in a manner described by the following discussion.

In some implementations, the heterogeneous scheduler 264 performs a heuristic ambiguity resolution for weighted traversal of the graph 400. For example, ambiguity in traversing the graph 400 can arise when the heterogeneous scheduler 264 can proceed in different paths (e.g., such as node 410 including directed edges to node 420 and node 430, respectively). In such instances, the heterogeneous scheduler 264 reevaluates the graph 400 to choose a particular node along a particular path that can saturate each processor on the electronic device 115 to the extent possible. In other words, the heterogeneous scheduler 264 chooses a particular node that minimizes the collective downtime across the processors and/or that maximizes concurrent runtime across the processors. In an implementation, for each of the possible paths to traverse through the graph 400 from the completed node (e.g., node 410), the heterogeneous scheduler 264 determines a "saturation" score and distance from the end of the graph to determine which subsequent node to select to execute a next algorithm.

In an example, the saturation score for selecting a particular node is based on a function of 1) a number of different processors that perform algorithms for a path starting with the particular node and 2) a distance to an end of a given graph from the particular node. The heterogeneous scheduler 264 determines that a first path from node 410 includes node 420. From node 420, the heterogeneous scheduler 264 determines that there are two respective paths to node 440 and node 450 (e.g., indicating that there is a sub-tree under node 420). In this example, a distance to an end of the graph 400 is two nodes starting from node 420 and continuing along the two respective paths to node 440 and node 450. For determining a saturation score and in view of the sub-tree under node 420, the heterogeneous scheduler 264 may include node 420, node 440, and node 450 in a group as discussed below.

The heterogeneous scheduler 264 determines a second path from node 410 that includes node 430 before reaching the end of the graph 400, and that the distance to the end of the graph 400 is a single node. Taking into account the respective distances to the end of the graph 400, the heterogeneous scheduler 264 compares a group 415 including node 420, node 440, and node 450 to a second group including only node 430. In an implementation, a smaller value of a distance to the end of the graph 400 may be weighted more in comparison with a larger value of another distance to the end of the graph 400. As a result, based on distance to the end of the graph 400, node 430 would be weighted more than node 420 in this example.

In the example of FIG. 4, the heterogeneous scheduler 264 determines a first saturation score for the group 415 including node 420, node 440 and node 450. The heterogeneous scheduler 264 determines a second saturation score for node 430 in the second group. The saturations scores are based at least in part on a number of various different processors that are utilized in performing one or more algorithms. The saturation score for the group 415 (e.g., corresponding to respective nodes for algorithms performed on the GPU, CPU and neural processor, in this example) is a higher score than a saturation score for node 430 which has a single algorithm performed by the CPU. Based on the respective saturation scores, the heterogeneous scheduler 264 then selects the group 415 including node 420 based on the higher saturation score in comparison with the lower saturation score of node 430. Although, as discussed above, the group 415 has a greater distance to the end of the graph 400, by virtue of including a higher saturation score than node 430, the heterogeneous scheduler 264 may still select node 420 for execution. After being selected, the algorithm ("Inference 2" on the GPU) at node 420 is dispatched to the GPU to be performed.

In some implementations, examples of variables that may determine a saturation score can include an amount of run time for the assigned processor to complete a given algorithm. Other variables may include, without limitation, an expected load on the processor when performing the algorithm, such as being based on a measurement of how many operations would be performed by the assigned processor when executing the algorithm.

The heterogeneous scheduler 264 can then select both node 440 and node 450 to dispatch the subsequent algorithms in parallel or substantially at the same time. In some implementations, after the respective algorithms at node 440 ("Inference 3" on the CPU) and node 450 ("Inference 4" on the neural processor) are completed, the heterogeneous scheduler 264 returns to node 430 to dispatch the associated algorithm ("Inference 5" to the CPU). At this point, the functionality corresponding to the graph 400 has been completely executed by the electronic device 115.

The following discussion relates to example information and code that portions of the computing environment described in FIG. 2 are able to access.

FIG. 5 conceptually illustrates example information derived during an integration stage and example code for performing predictions using a machine learning algorithm in accordance with one or more implementations.

As illustrated, metadata 510 includes information derived during an integration stage that occurs before executing compiled code. As discussed above in connection with FIG. 2, the framework 260 can analyze code and determine input parameters and output data format corresponding to various algorithms. For example, code be analyzed to determine a function's type, where the type includes an indication of the function's parameter types and return type. Based at least in part on the inputs parameters and output data format, the framework 260 can determine an order of algorithms and/or temporal dependencies between such algorithms. Examples of input parameters include a resolution, color format, or an aspect ratio. Examples of an output format include an array or an image.

In an implementation, the computing environment described in FIG. 2 may provide an application programming interface (API) that enables developers to include declarative statements in code to execute inference (e.g., predictive) functions that each utilize a particular algorithm related to a neural network model such as the following example code:
  addInference(some_ML_Algorithm);
  addInference(some_2nd_ML_Algorithm);

In an implementation, when such declarative statements are included in code that is currently being executed (e.g., during runtime), the graph generator 262 includes the corresponding algorithm as a node in a graph as discussed above in the aforementioned descriptions. As further illustrated, code 550 includes different statements for executing respective machine learning algorithms corresponding to predictions. The graph generator 262, using the two statements in code 550, can include respective nodes in a graph for the algorithms (e.g., "Segmentation" and "Landmarks").

Figure 6:
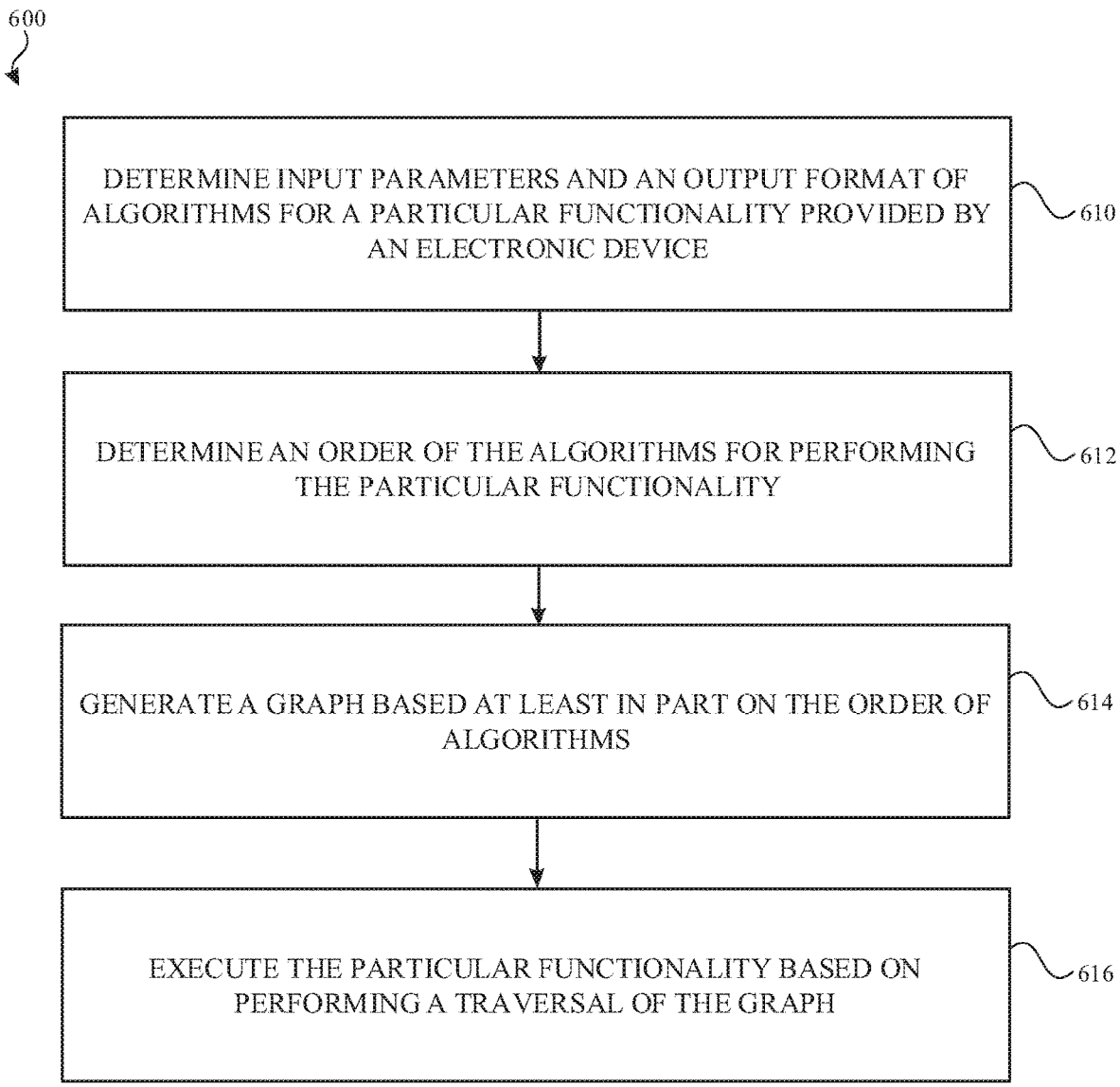
FIG. 6 illustrates a flow diagram of an example process for scheduling various algorithms across various processors provided in a given electronic device in accordance with one or more implementations.

FIG. 6 illustrates a flow diagram of an example process 600 for scheduling various algorithms across various processors provided in a given electronic device (e.g., the electronic device 115) in accordance with one or more implementations. For explanatory purposes, the process 600 is primarily described herein with reference to components of the computing architecture of FIG. 2, which may be executed by one or more processors of the electronic device 115 of FIG. 1. However, the process 600 is not limited to the electronic device 115, and one or more blocks (or operations) of the process 600 may be performed by one or more other components of other suitable devices, such as by the electronic device 110. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The framework 260 determines input parameters and an output format of algorithms for a particular functionality provided by an electronic device (e.g., the electronic device 115) (610). The framework 260 determines an order of the algorithms for performing the particular functionality based at least in part on temporal dependencies of the algorithms, and the input parameters and the output format of the algorithms (612). The graph generator 262 generates a graph based at least in part on the order of algorithms (614). In an implementation, the graph is a directed acyclic graph including a set of nodes corresponding to the algorithms where each node indicates a particular processor provided by the electronic device for executing an algorithm. The heterogeneous scheduler 264 executes the particular functionality based on performing a traversal of the graph (616). In an implementation, the traversal is a topological traversal of the set of nodes and the traversal is based at least in part on a score indicating whether selecting a particular node for executing over another node enables a greater number of processors to be utilized at a given time.

Figure 7:
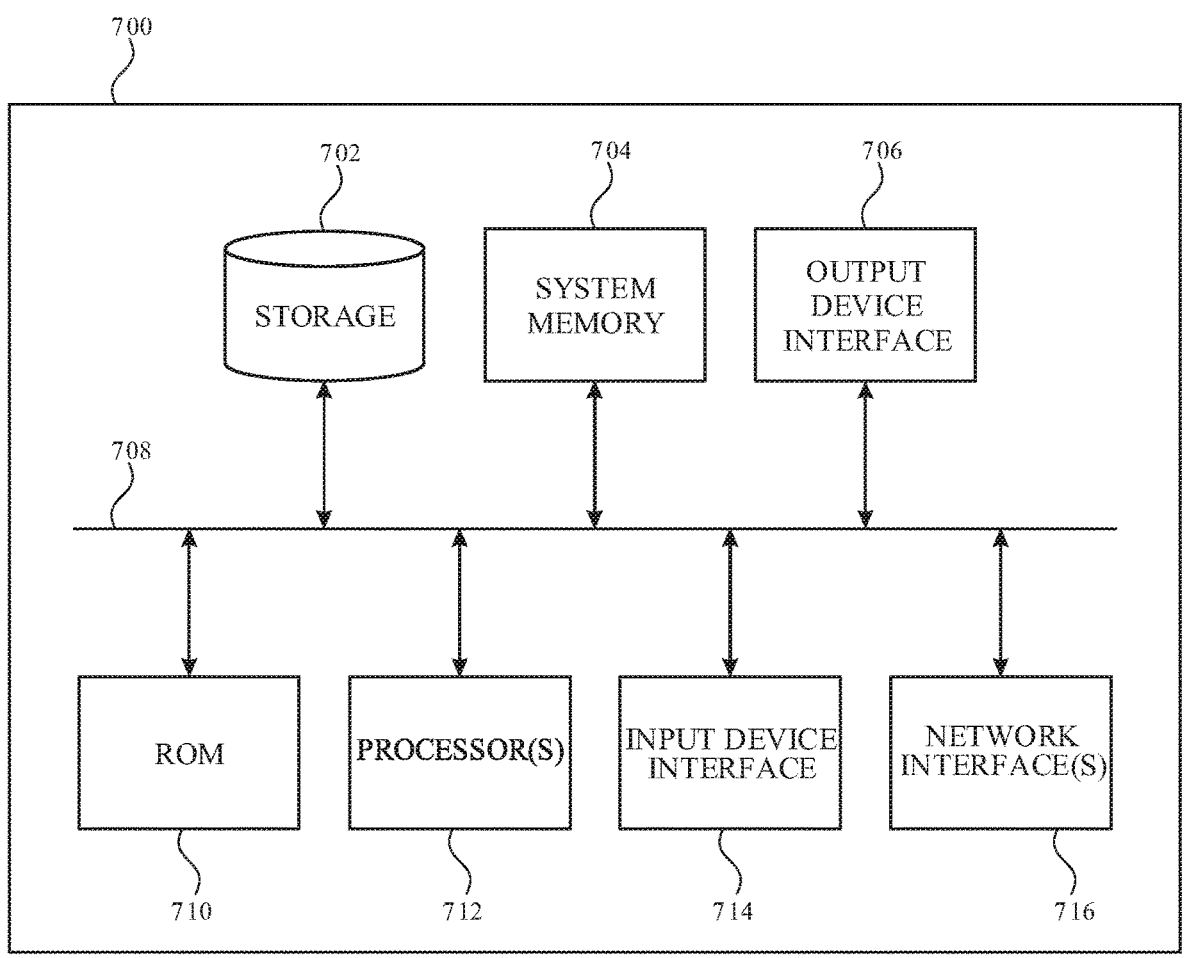
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of, the electronic device 110, the electronic device 115, and/or the server 120 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the electronic device 115 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   determining input parameters and an output format of algorithms for a particular functionality provided by an electronic device;
   determining an order of the algorithms for performing the particular functionality based at least in part on temporal dependencies of the algorithms, and the input parameters and the output format of the algorithms;
   generating a graph based at least in part on the order of the algorithms, the graph comprising a set of nodes corresponding to the algorithms, each node indicating a particular processor of the electronic device for executing an algorithm; and
   executing the particular functionality based on performing a traversal of the graph, the traversal comprising a topological traversal of the set of nodes and the traversal including a selection of a particular node for execution over another node based on execution of the particular node enabling a greater number of processors of the electronic device to be utilized at a given time than execution of the other node, wherein the processors include at least two of: a CPU, a GPU, or a neural processor.

2. The method of claim 1, wherein the input parameters include at least one of a resolution, color format, or an aspect ratio, the output format comprises an array or an image, and the graph comprises a directed acyclic graph.

3. The method of claim 1, wherein the algorithms of the set of nodes are executed by respective processors of the electronic device when the nodes are reached in the traversal.

4. The method of claim 1, wherein determining the order of the algorithms for performing the particular functionality further comprises:
   identifying an output of a first algorithm is utilized as an input to a second algorithm; and
   based at least in part on the identifying, determining that the first algorithm executes before the second algorithm when performing the particular functionality.

5. The method of claim 1, wherein the processors comprise at least the CPU, the GPU, and the neural processor.

6. The method of claim 1, wherein selecting the particular node for executing over another node is determined based at least in part on:
   for a first respective node, determining a first path including a first set of nodes from the first respective node until reaching a first particular last node of an end of the graph;
   for a second respective node, determining a second path including a second set of nodes from the second respective node until reaching a second particular last node of the end of the graph;
   comparing the first set of nodes to the second set of nodes; and
   selecting the second set of nodes based on the comparing when the second set of nodes utilizes a greater number of processor than the first set of nodes.

7. The method of claim 6, wherein selecting the second set of nodes based on the comparing is further based on determining respective distances of the first path and the second path to the end of the graph.

8. The method of claim 7, wherein a first distance to the end of the graph is weighted greater than a second distance to the end of the graph when the first distance is a smaller value than the second distance.

9. The method of claim 1, wherein the particular functionality comprises generating, using one or more predictive machine learning algorithms, a depth map based on a plurality of images.

10. A system comprising;
   a processor;
   a memory device containing instructions, which when executed by the processor cause the processor to:
      determine input parameters and an output format of algorithms for a particular functionality provided by the system;
      determine an order of the algorithms for performing the particular functionality based at least in part on temporal dependencies of the algorithms, and the input parameters and the output format of the algorithms;
      generate a graph based at least in part on the order of the algorithms, the graph including a set of nodes corresponding to the algorithms, each node indicating a particular processor of the system for executing an algorithm; and
      execute the particular functionality based on performing a traversal of the graph, the traversal including a selection of a particular node for execution over another node based on execution of the particular node resulting in a greater number of processors of the system being concurrently in use than execution of the other node, wherein the processors include at least two of: a CPU, a GPU, or a neural processor.

11. The system of claim 10, wherein the input parameters include at least one of a resolution, color format, or an aspect ratio.

12. The system of claim 10, wherein the output format comprises an array or an image.

13. The system of claim 10, wherein to determine the order of the algorithms for performing the particular functionality further causes the processor to:
   identify an output of a first algorithm is utilized as an input to a second algorithm; and
   based at least in part on the identifying, determine that the first algorithm executes before the second algorithm when performing the particular functionality.

14. The system of claim 10, wherein the processors comprise at least the CPU, the GPU, and the neural processor.

15. The system of claim 10, wherein to select the particular node for executing over another node is determined based at least in part on:
   for a first respective node, determining a first path including a first set of nodes from the first respective node until reaching a first particular last node of an end of the graph;
   for a second respective node, determining a second path including a second set of nodes from the second respective node until reaching a second particular last node of the end of the graph;
   comparing the first set of nodes to the second set of nodes; and
   selecting the second set of nodes based on the comparing when the second set of nodes utilizes a greater number of processor than the first set of nodes.

16. The system of claim 15, wherein to select the second set of nodes based on the comparing is further based on determining respective distances of the first path and the second path to the end of the graph.

17. The system of claim 16, wherein a first distance to the end of the graph is weighted greater than a second distance to the end of the graph when the first distance is a smaller value than the second distance.

18. The system of claim 10, wherein the particular functionality comprises generating, using one or more predictive machine learning algorithms, a depth map based on a plurality of images.

19. A non-transitory computer-readable medium comprising instructions, which when executed by a computing device, cause the computing device to perform operations comprising:
   determining input parameters and an output format of algorithms for a particular functionality provided by an electronic device, the electronic device comprising a plurality of processors, the plurality of processors including at least two of: a CPU, a GPU, or a neural processor;
   determining an order of the algorithms for performing the particular functionality based at least in part on temporal dependencies of the algorithms, and the input parameters and the output format of the algorithms;
   generating a graph based at least in part on the order of the algorithms, the graph comprising a set of nodes corresponding to the algorithms, each node indicating a particular processor of the plurality of processors for executing an algorithm of the node; and
   executing the particular functionality based on performing a traversal of the graph, the traversal comprising a topological traversal of the set of nodes and the traversal including a selection of a particular node for execution over another node based on execution of the particular node minimizing a collective downtime of the plurality of processors relative to execution of the other node.

20. The non-transitory computer-readable medium of claim 19, wherein to select the particular node for executing over another node is determined based at least in part on:
- for a first respective node, determining a first path including a first set of nodes from the first respective node until reaching a first particular last node of an end of the graph;
- for a second respective node, determining a second path including a second set of nodes from the second respective node until reaching a second particular last node of the end of the graph;
- comparing the first set of nodes to the second set of nodes; and
- selecting the second set of nodes based on the comparing when the second set of nodes utilizes a greater number of processor than the first set of nodes.

* * * * *